United States Patent Office 3,379,193
Patented Apr. 23, 1968

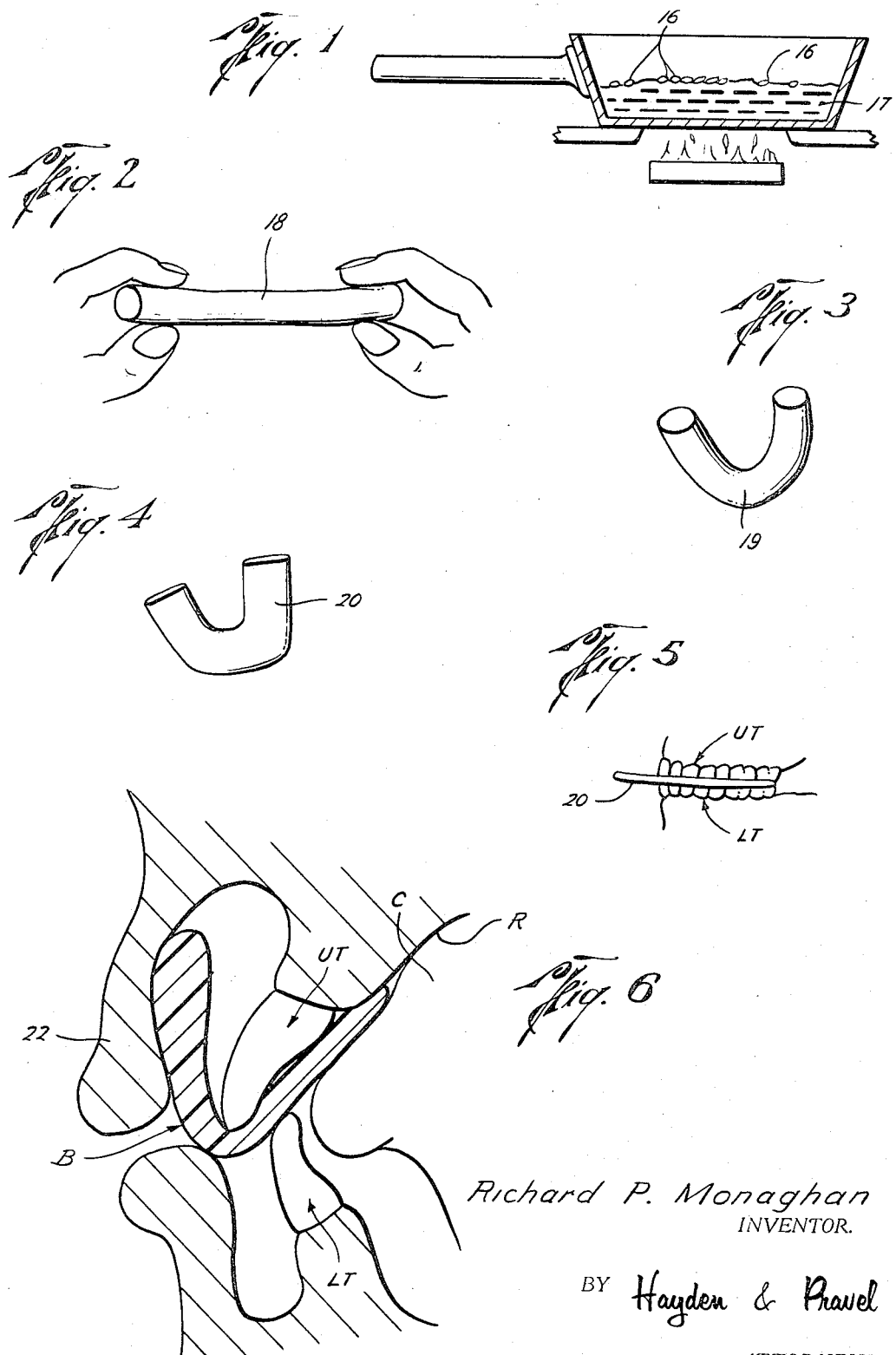

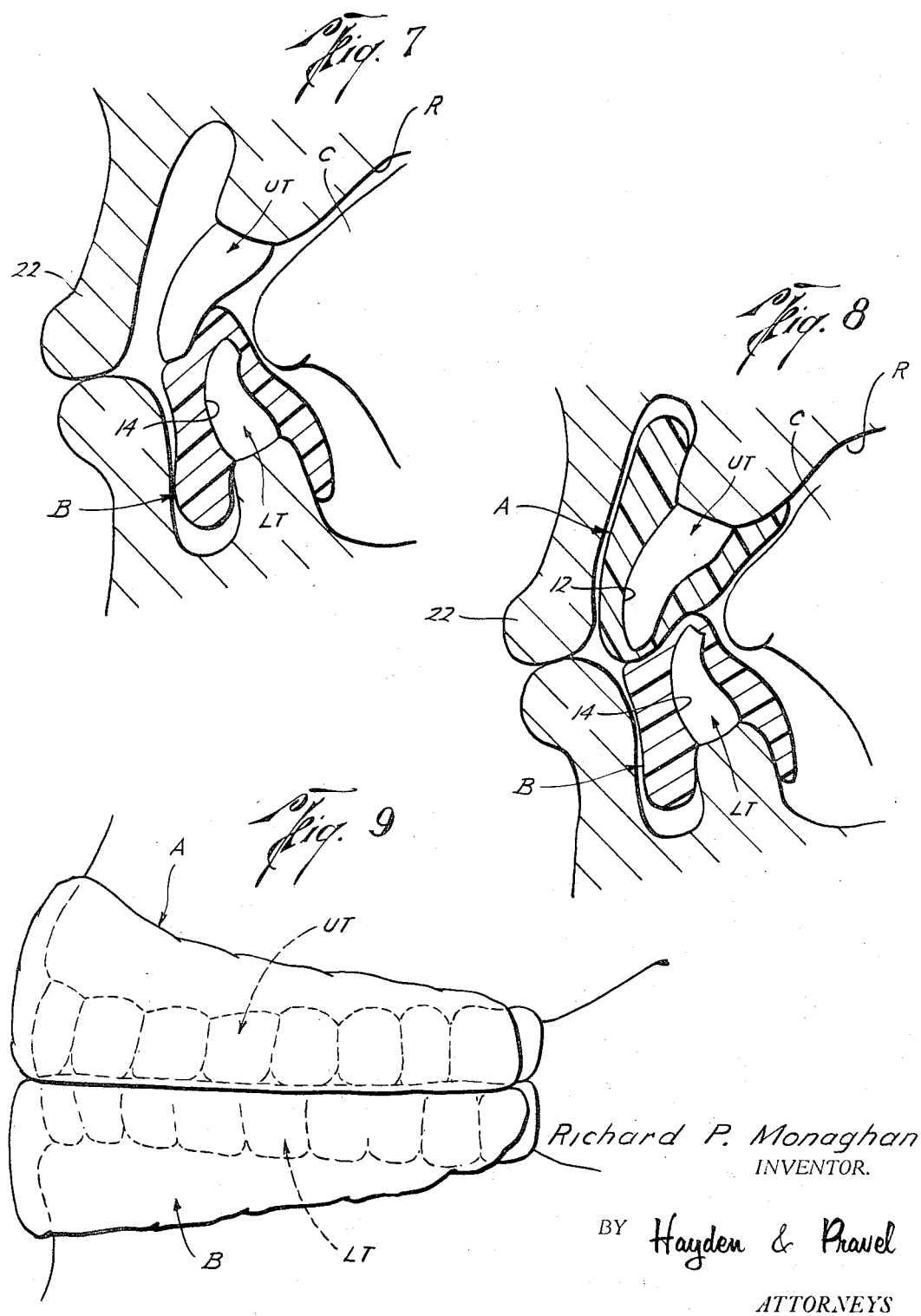

3,379,193
METHOD OF FORMING AND USING
TEETH COVERS
Richard P. Monaghan, Box 247, Overton, Tex. 75684
Filed Oct. 11, 1965, Ser. No. 494,409
9 Claims. (Cl. 128—136)

ABSTRACT OF THE DISCLOSURE

A method of forming a teeth cover for a person's lower set of teeth wherein plastic formable material is partially preformed on the person's upper set of teeth and thereafter is positioned on the lower set of teeth for a finalized shaping while in a plastic formable condition by closing the jaws together to the normally closed position. The method also includes the forming of a cover for the person's upper set of teeth by initially shaping it and then, with the finalized lower teeth cover in position also, finalizing the shape of the upper teeth cover with the jaws closed, whereby teeth protectors are provided which protect the teeth without subjecting the jaw to dangerous displacement. The teeth protectors thus shaped are valuable for use with toothpaste or anti-caries products because of their flexibility and conformity to the gums and teeth whereby massage of the gums and thorough distribution of the anti-caries product is accomplished.

---

Under most conditons wherein a mouthguard is needed for protecting the teeth against breakage, such as in football and other contact sports, a single teeth cover on the upper teeth is sufficient, especially if made in accordance with either of my prior co-pending U.S. patent applications Ser. No. 439,508 now Patent No. 3,224,443 or Ser. No. 275,420 now Patent No. 3,224,441. As described in said applications, the teeth cover or protector made in accordance with the inventions thereof, are constructed so that the jaws can close to their normal closed position when the teeth protector is in position on the upper teeth.

Although it has been considered desirable to have both the upper and lower sets of teeth covered by teeth covers under some conditions, the problems in preparing such teeth covers so as to fit comfortably in the mouth while still allowing the jaws to close to the normally closed position have been considered insurmountable. The present invention provides a solution to such problems and further provides methods for making and using teeth covers which render such teeth covers especially suitable for applying toothpaste, fluorides, and other anti-caries products to the teeth and for massaging same into the gums of a user in an economical, sanitary and efficient manner.

An object of this invention is to provide new and improved method of making teeth covers for both the upper and lower sets of teeth, wherein the teeth covers are constructed so that they may be used simultaneously and so that the jaws of the user may be closed to the normally closed position with both of the teeth covers in position on the teeth.

Another object of this invention is to provide a new and improved method for making and using teeth covers for the upper and lower sets of teeth wherein both are adapted to receive toothpaste, fluorides, and other anti-caries products so that by manipulation of the teeth and lips, a user may effectively coat the teeth and massage the gums with such products to prevent or inhibit caries.

A further object of this invention is to provide a new and improved method of forming a teeth cover for a lower set of teeth, wherein the cover is formed of a material which is in a softened state by initially shaping and forming the material over the upper set of teeth to conform generally to the upper arch, by thereafter finalizing the shape of the teeth cover on the lower set of teeth, and by allowing the material to set to such final shape in the mouth of the user.

A particular object of this invention is to provide a new and improved method of making upper and/or lower teeth protectors or covers from thermoplastic material which is in the form of small beads, whereby the handling, packaging and storing of the material is facilitated and is more economical than with sheets, strips and other conventional forms.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is in elevation, partly in section, illustrating one manner of heating the thermoplastic material to soften same;

FIG. 2 is a perspective view illustrating the shaping of the softened material into a rope-like shape;

FIG. 3 is a perspective view illustrating the shaping of the material into a substantially U-shape;

FIG. 4 is a perspective view illustrating the material in a horseshoe shape prior to positioning in the mouth of a user;

FIG. 5 is an elevation illustrating the first step in shaping the horseshoe shaped material in the mouth of the user;

FIG. 6 is a sectional view, partly in elevation, illustrating the pre-forming of the lower teeth cover in the mouth;

FIG. 7 is a view which is similar to FIG. 6 but illustrating the final forming of the lower teeth cover;

FIG. 8 is a view illustrating the final forming of the upper teeth cover, with the lower teeth cover in place; and FIG. 9 is an elevation illustrating the upper teeth cover and the lower teeth cover in position, with the jaws of the user closed to the normally closed position.

In the drawings, the letter A designates generally a teeth cover for an upper set of teeth UT. The letter B designates generally a teeth cover for a lower set of teeth LT. The method of making such teeth covers or protectors A and B, as will be explained in detail hereinafter, is such that the upper teeth cover A conforms closely with the upper set of teeth UT and the lower teeth cover B conforms closely with the lower set of teeth LT, and the teeth covers A and B are separable from each other, but they interfit (FIG. 8) when the jaws 10 and 11 of the user are brought into the normally closed position so that the upper and lower teeth come together into normal occlusion substantially as if the teeth covers A and B were not present in the mouth of the user. As will be more evident hereinafter, the teeth in the upper set UT are imbedded or impressed in the teeth cover A to form a cavity 12 for each tooth in the upper set of teeth UT so that after the teeth protector A is made and has set to the final fixed resilient shape, the cover A may be removed from the set of teeth UT and a toothpaste, fluoride gell or paste, or any anti-caries product may be inserted into the various cavities 12. Thereafter, the teeth cover A may be re-inserted over the teeth UT so that the paste or gell with the anti-caries constitutents may contact the teeth as well as the adjacent gums. Likewise, as will be more fully explained, the lower teeth cover B is formed with a cavity 14 for each of the teeth in the lower set of teeth LT for receiving the toothpaste, flouride or anti-caries product.

Considering first the method of making the lower tooth cover or protector B, the material which is to be used in the forming of the teeth cover B is obtained in the quantity which is required for the covering of the lower set of teeth LT. Such material is a thermoplastic material which may be softened by heat and which may be soft enough at a temperature below about 180° F. to be formed in the mouth of a user. When the temperature of the material inserted into the mouth of the user exceeds about 180° F., the mouth is either burned or is made so uncomfortable that the process of this invention cannot be satisfactorily performed. The material forming the lower teeth cover B must also be capable of setting to a fixed resilient shape after it has cooled below a softening point so that it may be reused without losing its shape. Preferably, the material should also be one that can be re-softened and re-formed. One of the most satisfactory materials for the teeth cover B is sold under the trade name "Elvax," and it is a co-polymer of ethylene vinyl acetate. Such material may be used alone, or it may be modified with the addition of mineral oil in an amount of from about 10% to about 20% by weight if it is desired to reduce the softening point of the material. Fibers such as nylon and other non-toxic materials may also be mixed with the thermoplastic material. Examples of suitable fibers are Orlon, Dacron, glass, cotton and cellulose acetate. Coloring materials provide a white color or any other desired color may be added. For example, a coloring mixture composed of about 65% silicone rubber and 35% titanium dioxide may be employed. Such coloring material may be added to the basic thermoplastic material in an amount of about one-tenth percent by weight to obtain an extremely white color if such is desired.

In a specific form of the invention, the formula for the preferred material includes 47% of the co-polymer of ethylene vinyl acetate, 47% mineral oil (UFT), 5% nylon fibers, and 1% titanium dioxide, by weight.

Other elastomers besides the co-polymer of ethylene vinyl acetate may be used, such as, vinyl ester resins including polyvinyl acetate, polyvinyl chloride, polyvinyl alcohol and polyvinyl butyral.

The material which is initially employed in the method of making the lower teeth cover B may be in the form of a sheet or strip, but it has been found that it is highly advantageous to provide the material in the form of relatively small beads so that the material may be dispensed and packaged on the basis of about two teaspoonfuls of such beads for the average teeth protector for one set of teeth. Furthermore, by the use of the beads, the material may be readily stored in tin cans so that the packaging, handling and storage of the material for forming the lower teeth protector or cover B is simplified as compared to the use of sheets or strips of material which require more extensive bundling and handling.

The beads 16 as illustrated in the drawing, are formed of the thermoplastic material having the characteristics set forth above, and they are initially softened by placing the required number of the thermoplastic beads into a pan or dish of boiling water 17. In most instances, a heaping tablespoonful of the thermoplastic beads 16 is sufficient for the forming of the lower teeth cover B. After about one or two minutes, the thermoplastic beads 16 are softened sufficiently so that upon stirring with a spoon or similar utensil, the softened beads 16 will join together in a mass which can then be removed from the water.

The thermoplastic beads 16 when formed in the mass by their adherence to each other may be removed as a mass with a spoon or tongs of any conventional type. The mass may then be worked with the fingers by the user so as to roll the material or knead it into a rope-like shape about four or five inches in length as indicated at 18 in the drawings. It is preferable to wet the fingers in cold water before attempting to roll the material into the rope-like shape 18 so that the material may be worked at as high a temperature as possible to give a longer period in which the material is in the softened state. The rope-like shape 18 is then formed into a U-shape as indicated at 19 and is flattened to resemble a horeshoe as indicated at 20. Preferably, the thickness of the material when in the horseshoe shape 20 is about one-sixteenth of an inch or more.

While the material is in the flat horseshoe shape 20, and while still soft enough to be formed, the material is inserted between the upper set of teeth UT and the lower set of teeth LT and then the tongue C is used to push the inside edge of the material towards the roof R of the mouth. The outer edge of the horseshoe shape 20 is pushed under the upper lip 22 and around the upper gum 23 with the tongue C and with the lip 22. The preliminary form of the lower teeth cover B is thus shaped on the upper set of teeth UT so that it generally conforms to the upper arch of the set of teeth UT. It is to be noted that it is not necessary, and normally undesirable, to close the jaws of the user together at this stage as indicated by the illustration in FIG. 6. After the lower teeth cover B has been pre-formed to the shape of the arch of the upper set of teeth UT, it is removed while still in a softened state and is draped or positioned over the lower set of teeth LT. If the material has become set prior to removing it from the upper teeth UT, it may be softened again by placing it back into the boiling water. Thus, the material in the pre-formed softened state is positioned on the lower teeth LT and the back teeth of the user are closed together so that the jaws are in the closed position with the teeth in occlusion. The lips, tongue and a sucking action may then be employed to complete the formation of the lower teeth cover B to the shape illustrated in FIG. 7. The lower teeth cover B is allowed to remain in the mouth on such lower set of teeth LT until it has set to the final fixed shape, while still remaining resilient and tough. It should be noted that the thickness of the material at the rear teeth where the teeth actually would normally contact each other is extremely thin so that there is no appreciable difference in the position of the teeth with the protector B in position from that which the teeth would assume when in the normally closed position without any teeth cover in the mouth.

The teeth cover B may thereafter be removed from the lower teeth LT. Prior to forming the teeth protector A, such lower teeth protector B is removed from the lower teeth LT and then the steps are performed for the formation of the upper teeth cover A.

The same materials as described above for the cover B may also be used for the cover A, and the same steps are performed for forming the upper teeth cover A, as were described above in connection with the formation of the lower teeth cover B up to the preliminary shaping step illustrated in FIG. 6 of the drawings. Thereafter, instead of removing the material from the teeth UT, the material for forming the upper teeth cover A is fully shaped on the upper teeth T, but the teeth are not brought together by a closing of the jaws until the lower teeth cover B is placed in position on the lower teeth LT. At that time, the jaws of the user are brought into the normally closed position, and since the lower teeth cover B has been set to the final fixed shape, it impresses itself and interfits with the external inner surface of the upper teeth cover A when the jaws of the user are in the normally closed position (FIG. 8). The thickness of the material between the back upper teeth and the material on the lower upper teeth from the lower teeth cover B is extremely thin and, as pointed out previously in connection with the lower teeth cover B, such thickness does not interfere with the substantial closing of the jaws of the user to the normally closed position.

With the teeth cover A in substantially the shape shown in FIG. 8, the material of the teeth cover A is allowed to set to its final fixed shape, as illustrated in FIGS. 8 and 9.

Thereafter, both the upper teeth cover A and the lower teeth cover B may be removed as desired, and may be re-inserted on their respective sets of teeth as desired. In some sports, it may be desirable to have both teeth covers A and B in position. Since the teeth are brought to the substantially normally closed position in the manufacture of the teeth covers A and B, the normal swallowing can be accomplished by the user even though both of the teeth covers A and B are in position during use. Also, the mouth can be opened and the teeth covers A and B will remain on their respective sets of teeth UT and LT. The teeth covers A and B do not adhere to each other when they are separated by an opening of the jaws of the user so that the user may expectorate, swallow and perform other normal functions which are necessary if the protectors or covers A and B are to remain in the mouth for any extended length of time.

The teeth covers A and B are also especially adapted for receiving toothpaste, fluorides in paste or gell form, and other anti-caries products within the cavities 12 and 14 of the teeth covers A and B, respectively. Thus, a user may insert the toothpaste or other anti-caries products in such cavities 12 and then position the protector A on the upper set of teeth UT. At the same time, the lower cover B may be provided with similar toothpaste or anti-caries product in the cavities 14 and the cover B can then be placed on the lower set of teeth LT. The toothpaste or other anti-caries product may then be massaged and coated on the teeth by moving the jaws upwardly and downwardly and squeezing and compressing the teeth covers A and B so that they function as massaging elements on the teeth and the adjacent gums. A chewing action takes place which produces a suction and a spreading effect so that the fluorides and other anti-caries products are distributed well over the teeth and gums with a minimum of effort. This is particularly desirable in connection with young children who find such procedure much easier and more fun than brushing the teeth.

It should also be noted that for young children, and even older children and adults, the present invention is particularly desirable since the precise configuration of each of the teeth covers A and B may be changed as desired at later times after they are initially formed by simply placing the teeth covers A or B into boiling water, allowing them to become softened and then reforming the teeth covers to the new condition of the teeth.

Although the invention has been described for use in several circumstances by way of example, it will be understood that the invention is not to be limited thereto.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A method of forming a teeth cover for the lower set of teeth, comprising the steps of,
    (a) positioning a material in the mouth of the user while in a plastic formable condition,
    (b) distributing and shaping such material in front of and behind the upper set of teeth to partially preform the material so as to generally conform to the upper arch,
    (c) removing the material from the upper arch while retaining the general configuration thereof,
    (d) thereafter positioning the partially preformed material over the lower set of teeth,
    (e) finalizing the shape of the material while in a plastic formable condition with the teeth and tongue of the user and by closing the jaws of the user together to the normally closed position, and
    (f) allowing said material to set to a fixed final resilient shape in the mouth of the user with the shape of substantially all of the lower teeth impressed therein.

2. The method set forth in claim 1, including the additional steps of forming a teeth cover for the upper set of teeth to be used simultaneously with the teeth cover for the lower set of teeth, comprising:
    (a) removing the teeth cover from the mouth after it has been formed to its final resilient shape,
    (b) positioning a second piece of material in the mouth of a user while in a plastic formable condition,
    (c) distributing and shaping said second piece of material in front of and behind the upper set of teeth to embed substantially all of the upper teeth therein,
    (d) re-inserting the teeth cover for the lower set of teeth on such lower teeth while the second piece of material is distributed over the upper set of teeth in a softened plastic state,
    (e) closing the jaws of the user to the normally closed position which the user's teeth would assume in the absence of any teeth cover, and
    (f) allowing the second piece of material to set to a fixed final resilient shape in the mouth of the user, whereby both of the teeth covers may be used in the mouth simultaneously or may be removed and subsequently re-inserted in the mouth.

3. A method of forming a teeth cover, comprising the steps of,
    (a) heating a group of beads formed of a thermoplastic to soften same,
    (b) forming the beads into an elongate mass and then shaping it while in the softened state to a substantially U-shape prior to inserting it into the mouth of a user,
    (c) thereafter positioning the U-shaped mass in the mouth of the user between the upper and lower sets of teeth while the material is in a softened state,
    (d) shaping and distributing such material in front of and behind the upper set of teeth to embed a substantial portion of such teeth therein,
    (e) closing the jaws of the user to the normally closed position which the user's teeth would assume in the absence of any teeth cover, and
    (f) allowing said material to set to a final resilient shape in the mouth of the user, whereby the teeth cover may be removed and subsequently re-inserted in the mouth.

4. A method of forming a teeth cover, comprising the steps of,
    (a) heating a group of beads formed of a thermoplastic to soften same,
    (b) forming the beads into an elongate mass and then shaping it while in the softened state to a substantially U-shape prior to inserting it into the mouth of a user,
    (c) thereafter positioning the U-shaped mass in the mouth of the user between the upper and lower sets of teeth while the material is in a softened state,
    (d) distributing and shaping such material in front of and behind the upper set of teeth to partially preform the material so as to generally conform to the upper arch,
    (e) removing the material from the upper arch while retaining the general configuration thereof,
    (f) thereafter positioning the partially preformed material over the lower set of teeth,
    (g) finalizing the shape of the material with the teeth and tongue of the user and by closing the jaws of the user together to the normally closed position, and
    (h) allowing said material to set to a fixed final resilient shape in the mouth of the user with the shape of substantially all of the lower teeth impressed therein.

5. The method set forth in claim 3, wherein the material is a co-polymer of ethylene and vinyl acetate.

6. The method set forth in claim 4, wherein the material is a co-polymer of ethylene and vinyl acetate.

7. A method of forming and using a teeth cover for applying toothpaste, fluorides and anti-caries products to the teeth, comprising the steps of:
 (a) positioning a material in the mouth of a user while in a plastic formable condition,
 (b) distributing and shaping such material in the mouth to cover substantially all of the upper teeth,
 (c) closing the jaws of the user together to the normally closed position to embed the upper teeth into such material so as to form a cavity for each tooth,
 (d) allowing the material to set to a fixed final resilient shape in the mouth of the user,
 (e) removing the teeth cover thus formed,
 (f) placing an anti-caries product in said cavity for each tooth, and
 (g) thereafter re-inserting the teeth cover into position on the upper teeth for contacting the upper teeth and gums of the user with the anti-caries product.

8. A method of forming and using a teeth cover for applying toothpaste, fluorides and anti-caries products to the teeth, comprising the steps of:
 (a) positioning a material in the mouth of a user while in a plastic formable condition,
 (b) distributing and shaping such material in the mouth to cover substantially all of the lower teeth,
 (c) closing the jaws of the user together to the normally closed position to embed the lower teeth into such material so as to form a cavity for each tooth,
 (d) allowing the material to set to a fixed final resilient shape in the mouth of the user,
 (e) removing the teeth cover thus formed,
 (f) placing an anti-caries product in said cavity for each tooth, and
 (g) thereafter re-inserting the teeth cover into position on the lower teeth for contacting the lower teeth and gums of the user with the anti-caries product.

9. A method of forming and using teeth covers for the upper and lower sets of teeth for applying toothpastes, fluorides, and anti-caries products to the teeth, comprising the steps of,
 (a) positioning a material in the mouth of the user while in a plastic formable condition,
 (b) distributing and shaping such material in front of and behind the upper set of teeth to partially preform the material so as to generally conform to the upper arch,
 (c) removing the material from the upper arch while retaining the general configuration thereof,
 (d) thereafter positioning the partially preformed material over the lower set of teeth,
 (e) finalizing the shape of the material with the teeth and tongue of the user and by closing the jaws of the user together to the normally closed position to form a cavity for each tooth,
 (f) allowing said material to set to a fixed final resilient shape in the mouth of the user with the shape of substantially all of the lower teeth impressed therein,
 (g) removing the teeth cover from the mouth after it has been formed to its final resilient shape,
 (h) positioning a second piece of material in the mouth of a user while in a plastic formable condition,
 (i) distributing and shaping said second piece of material in front of and behind the upper set of teeth to embed substantially all of the upper teeth therein,
 (j) re-inserting the teeth cover for the lower set of teeth on such lower teeth while the second piece of material is distributed over the upper set of teeth in a softened plastic state,
 (k) closing the jaws of the user to the normally closed position which the user's teeth would assume in the absence of any teeth cover to form a cavity for each tooth,
 (l) allowing the second piece of material to set to a fixed final resilient shape in the mouth of the user, whereby both of the teeth covers may be used in the mouth simultaneously or may be removed and subsequently re-inserted in the mouth,
 (m) thereafter removing both of the teeth covers from the mouth,
 (n) placing an anti-caries product in said cavity for each tooth in both teeth covers, and
 (o) thereafter re-inserting the teeth covers into position on the upper and lower sets of teeth for contacting them with the anti-caries products.

References Cited
UNITED STATES PATENTS

| | | | |
|---|---|---|---|
| 3,060,935 | 10/1962 | Riddell | 128—260 |
| 3,112,744 | 12/1963 | Grossberg | 128—136 |
| 3,211,143 | 10/1965 | Grossberg | 128—136 |
| 3,314,423 | 4/1967 | Boatwright et al. | 128—136 |

ADELE M. EAGER, *Primary Examiner.*